Aug. 9, 1938.   C. J. KELLER   2,126,473
METHOD OF MAKING TUBULAR ARTICLES
Original Filed Aug. 31, 1933   3 Sheets-Sheet 3

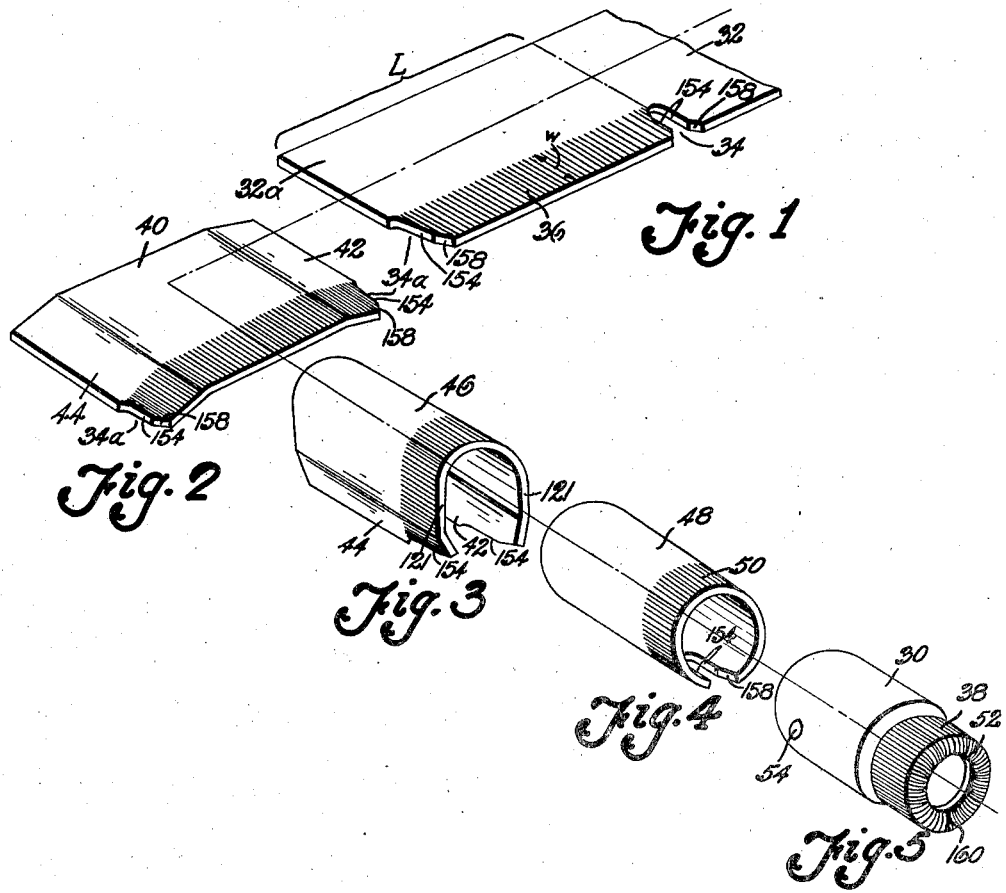
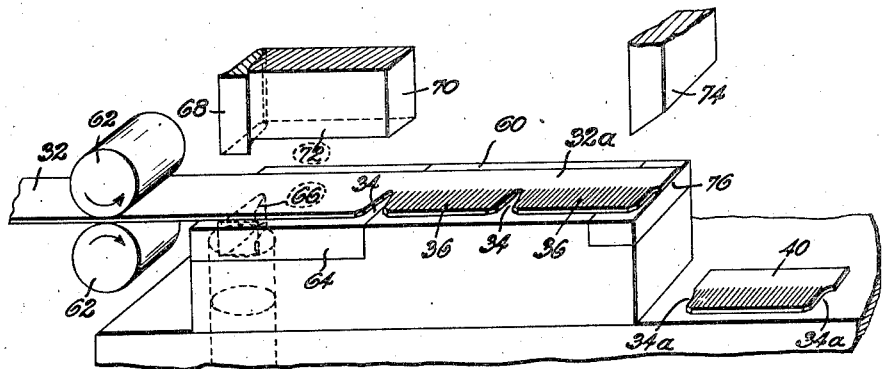

INVENTOR
Clarence J. Keller
BY Spencer Hardman & Fehr
his ATTORNEYS

Patented Aug. 9, 1938

2,126,473

UNITED STATES PATENT OFFICE 2,126,473

METHOD OF MAKING TUBULAR ARTICLES

Clarence J. Keller, Anderson, Ind., assignor to General Motors Corporation, Detroit, Mich., a corporation of Delaware Original application August 31, 1933, Serial No. 687,621. Patent No. 2,081,038, dated May 18, 1937. Divided and this application February 10, 1936, Serial No. 63,062

8 Claims. (Cl. 29—156)

This invention relates to the manufacture of tubular articles and more particularly to a novel method for forming tubular articles from a continuous strip of flat material.

This novel method is practiced in an apparatus which forms the subject matter of my Patent #2,081,038 granted May 18, 1937 on my application Serial No. 687,621, filed on August 31, 1933, of which the present application is a division.

It is one of the objects of the present invention to devise a method whereby to form tubular articles from a continuous strip of flat material through such progressive stages of configuration as will require the simplest of operations on the material.

It is another object of the present invention to provide in the method for diametric reduction of a portion of a tubular article, excluding thereby any overlap of material or gap in the reduced portion.

It is another object of the present invention to provide in the method for obtaining a knurled cylindrical portion in the tubular article.

It is another object of the present invention to provide in the method for the configuration of an end portion of the tubular article into an annular flange, excluding thereby any overlap of the flange material or gap therein.

It is another object of the present invention to provide in the method for the formation of a bead in the cylindrical article wall.

These various objects are accomplished by notching a strip of material at regular intervals and by knurling the strip. Thereafter knurled and notched blanks are shorn off the strip, preferably by cutting through the line of symmetry of a notch so that the severed edges of a blank terminate in semi-notches. Each blank is then formed into tubular shape through progressive stages of configuration, to wit, pre-bending of two opposite end-portions of a blank adjacent the severed edges out of the main plane of the blank, bending of a central portion of the pre-bent blank into semi-cylindrical shape about an axis parallel to the severed edges, whereby the adjoining end portions of the blank extend as parallel legs and the pre-bent blank ends assume a position in which they partly close the semi-cylindrical blank and thus facilitate the final closing of the blank into tubular shape. The two semi-notches of the originally flat blank combine into a complete notch during formation of the semi-cylindrical blank into tubular shape. The original notch in the strip and the combined notch in the tube are of the same shape, having two substantially parallel walls merging into oppositely flaring walls near the open end of the notch. The notched tube end portion is then uniformly radially contracted whereby the substantially parallel notch walls approach and engage each other during the contraction, and the flaring notch walls combine into a wedge-shaped notch in the end of the contracted tube portion which is subsequently crimped inwardly until the walls of said wedge-shaped notch engage each other. In this manner, an annular flange is formed at the end of the contracted tube portion without any overlap of the flange material or gap therein. A bead is finally formed in the tube wall by forcing a portion of said wall into a die cavity which determines the shape and extent of the bead.

Further objects and advantages of the present invention will be apparent from the following description, reference being had to the accompanying drawings wherein a preferred embodiment of the present invention is clearly shown.

In the drawings:

Figs. 1 to 5, inclusive, illustrate successive steps in the configuration of flat strip material into a finished tubular article.

Fig. 6 diagrammatically illustrates the notching and knurling of the strip and the severance of notched and knurled blanks from said strip.

Figures 12, 13:
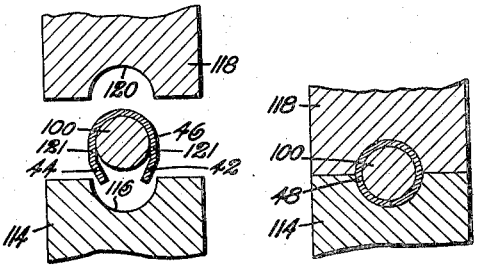
Figure 11:
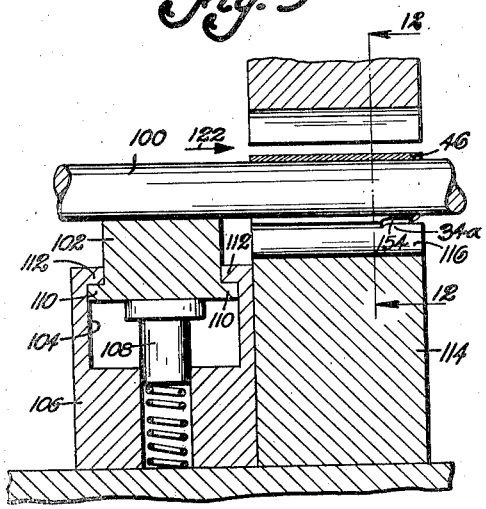

Figs. 11 to 13, inclusive, illustrate the formation of a semi-cylindrical tube into the tubular shape shown in Fig. 4. More particularly, Fig. 12 is a fragmentary section taken on line 12—12 of Fig. 11.

Figure 14:
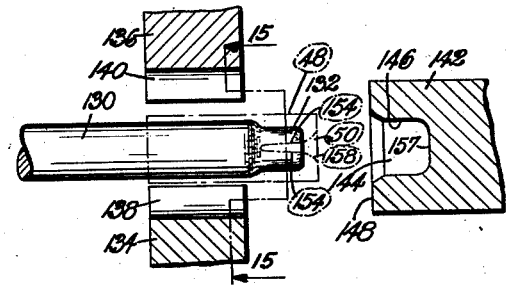
Figure 15:
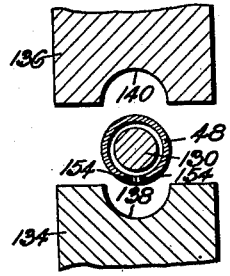
Figure 16:
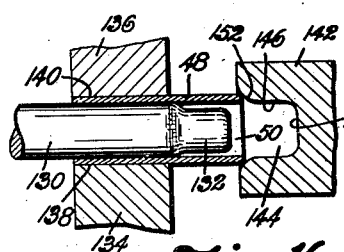

Figs. 14 to 18, inclusive, illustrate the contraction of the notched end portion of a tube and the formation of an annular flange at the end of the contracted tube portion as shown in Fig. 5. More particularly, Fig. 15 is a fragmentary section taken on line 15—15 of Fig. 14.

Figure 19:
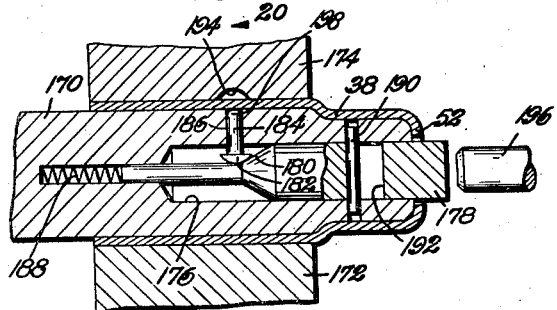
Figure 20:
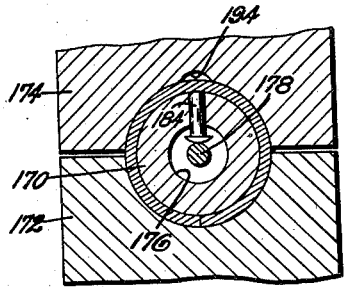
Figure 21:
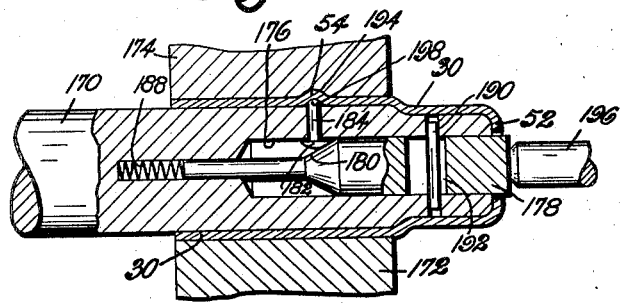

Figs. 19 to 21, inclusive, illustrate the formation of a bead in the tube wall. More particularly, Fig. 20 is a fragmentary section taken on the line 20—20 of Fig. 19.

Referring to the drawings, and more particularly to Figs. 1 to 5, inclusive, the instant method contemplates the formation of tubular articles, such as the illustrated socket 30, from a supply strip 32 of sheet material in a manner to be described presently. A notch 34 is punched into the supply strip 32 at equal distances so that the strip portion 36 of the width w may be contracted into the reduced tube end 38 and an integral annular flange 52 may be formed at the end of the contracted tube portion (see Fig. 5). The strip portion 36 is then knurled and a notched and knurled blank 40 of the length L is subsequently shorn off strip 32. Two opposite end surfaces 42 and 44 of the blank are then bent out of the main plane of blank 40. Thereafter, the blank is successively bent into the semi-cylindrical shape 46 (see Fig. 3) and into the tubular shape 48 (see Fig. 4). Finally, the knurled and notched tube end 50 is uniformly radially contracted as shown at 38 in Fig. 5, the end of the contracted tube portion 38 is formed inwardly to provide an annular flange 52 and one or more beads 54 are raised in the cylindrical wall of socket 30.

In the following description reference is made to structure which is capable of performing the various steps of the novel method. It is to be understood, however, that the disclosed structure is merely exemplary and that other structure may be applied for the same method without departing from the spirit of this invention. It is likewise to be understood that the illustrated structure, or structure equivalent thereto, may be incorporated in one machine aggregate or may consist of independent aggregates, whichever mechanical expediency demands.

For simplicity of description, the various steps of the novel method will be described under the following headings and in the order in which they appear hereafter: Notching and knurling of strip and severance of blanks, pre-bending of blank ends, formation of pre-bent blank into semi-cylindrical shape, formation of semi-cylindrical blank into tubular shape, contraction of slotted tube end and formation of annular flange, and formation of bead in tube wall.

*Notching and knurling of strip and severance of blanks*

Referring particularly to Fig. 6, a supply strip 32 is fed upon a support 60 by suitable feeding provisions such as the cooperating feed rolls 62 which may be intermittently rotated in opposite directions in any suitable manner, thereby to advance the strip 32 the distance L, i. e. the length of a blank 40. Mounted on the support 60 is a steel plate 64 which is provided with a cavity 66, adapted to cooperate with a correspondingly shaped, reciprocable punch 68 in order to cut a notch 34 in strip 32. Reciprocable independently of, or together with, punch 68 is a knurling die 70 which is of the same length and width as the knurled portion 36 of a blank 40. The lower surface 72 of die 70 engages and knurls the aligned strip portion 36 at the end of a downward stroke as can be readily understood. It is, of course, immaterial whether the strip is first knurled and then notched, or vice versa, neither is it imperative that the knurling operation takes place where indicated in Fig. 6, the only limitation being that the knurling die 70 performs on a proper strip portion, i. e. between two consecutive notches of the strip.

Having obtained a notched and knurled strip end as indicated in Fig. 6, blanks 40 are severed from said strip by any suitable structure such as the cooperating shear members 74 and 76. In the present instance, shear member 76 is mounted on support 60 and shear member 74 is reciprocable into cooperation with its companion member 76 for severance of a blank 40 from the notched and knurled strip end 32a. It appears from Figs. 1, 2 and 6 that the strip end 32a is severed through the line of symmetry of a notch 34, so that each blank is provided with two complementary notch portions 34a which form a complete notch upon formation of the blank into tubular shape.

*Pre-bending of blank ends*

Figure 7:
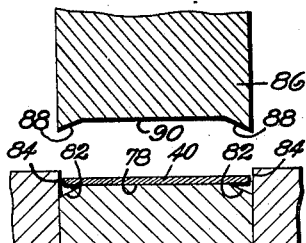
Figs. 7 and 8 illustrate the pre-bending of a blank into the shape shown in Fig. 2.
Figure 8:
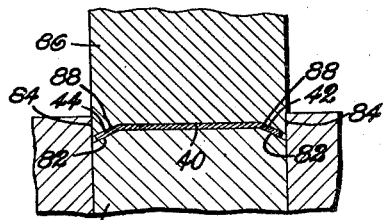

Referring more particularly to Figs. 7 and 8, a severed blank 40 is placed on the top surface 78 of a member 80, opposite ends of said top surface being tapered as indicated at 82. Suitable stops 84 prevent lateral displacement of blank 40 while resting on surface 78. Cooperating with block 80 is a reciprocable member 86, the ends 88 of the bottom surface 90 of which are parallel to the surfaces 82 of the lower member 80. During descent of member 86 from the position shown in Fig. 7 to that shown in Fig. 8, the tapered surfaces 82 and 88 of members 80 and 86, respectively, cooperate to bend the two opposite ends 42, 44 of the blank out of the main plane thereof, so that the blank then assumes the shape shown in Figs. 2 and 8.

*Formation of pre-bent blank into semi-cylindrical shape*

Figure 9:
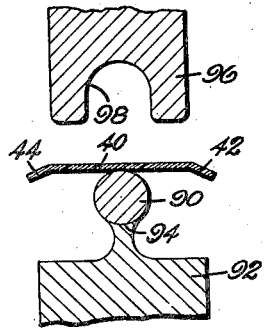
Figs. 9 and 10 illustrate the formation of a pre-bent blank into the semi-cylindrical shape shown in Fig. 3.
Figure 10:
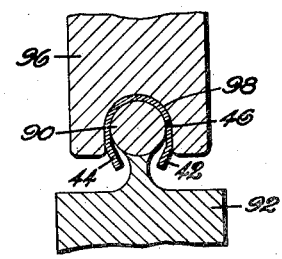

Referring particularly to Figs. 9 and 10, the pre-bent blank 40 is next placed on a cylindrical arbor 90 with the bent blank ends 42 projecting downwardly toward the arbor. It is imperative that the blank be centrally sustained on the arbor, and any suitable means (not shown) may be employed for locating the blank centrally on the arbor and for preventing said blank from gravitating off the arbor. The arbor itself is in the present instance shown stationary and carried by a base 92 which may provide a concave bed 94 to which the arbor is secured in any suitable manner. Cooperating with the arbor 90 is a reciprocable member 96, having a semi-circular groove 98 which is adapted to cooperate with arbor 90 to form the pre-bent blank 40 into the semi-cylindrical shape 46 upon descent of said member from the position shown in Fig. 9 to that shown in Fig. 10. It is obvious that the semi-cylindrical blank 46 can be removed from the arbor 90 only by longitudinal travel thereon until it clears the arbor.

*Formation of semi-cylindrical blank into tubular shape*

Referring more particularly to Figs. 11 to 13, inclusive, the semi-cylindrical blank 46 is now placed on a cylindrical arbor 100 which is preferably floatingly mounted in a manner similar to that shown in Fig. 11 wherein the arbor is suitably secured to a base 102 which is vertically slidable in a recess 104 of a member 106. A spring-urged plunger 108 normally urges the base 102 and arbor into the upper-most position in which two lateral lugs 110 of said base engage shoulders 112 of member 106. Cooperating with arbor 100 is a lower forming member 114, having a semi-cylinder wall 116. Also cooperating with arbor 100 is a reciprocable bending member 118 which has a semi-cylindrical wall 120 of the same dimensions as wall 116 of member 114. Upon descent of member 118 from the uppermost position in Fig. 12, the wall 120 thereof will first engage blank 46 and firmly clamp the same against the arbor 100 as can be readily understood. Upon continued descent of member 118, the arbor 100 with the blank 46, which is clamped thereto, will approach the lower forming member 114 against the tendency of the spring urged plunger 108 to retain the arbor in its uppermost position. During such continued descent of arbor and blank the parallel legs 121 together with the bent end portions 42, 44 of the blank will be forced into engagement with the wall 116 of the lower forming member 114 as best shown in Fig. 13. In connection herewith, it is to be noted that the pre-bent ends 42, 44 of the semi-cylindrical blank 46 assume a position in which they partly close the semi-cylinder and thus facilitate the final closing of the blank into tubular shape by the lower forming member 114.

It is not imperative that the arbor 100 is floatingly mounted, instead arbor 100 may be stationary and the forming members 114, 118 may be reciprocated toward and away from the arbor. However, for simplicity of construction and in order to eliminate considerable bending stresses in the arbor 100, it is preferable that the latter be floatingly mounted and that one of the forming members 114, 118 be reciprocable and the companion member be stationary. Since the arbors 90 and 100 are of the same diameter, it is also advisable to form the pre-bent blank into the semi-cylindrical shape 46 on the floating arbor 100, in which case the forming member 96 would preferably cooperate with that portion of the floating arbor 100 which is located vertically above its base 102. The semi-cylindrical blank 46 would then merely have to be advanced on the arbor 100 in the direction of arrow 122 in Fig. 11 in order to be placed in cooperative alignment with the forming members 114, 118.

*Contraction of notched tube end and formation of annular flange*

Figure 17:
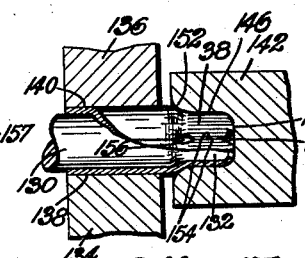
Figure 18:
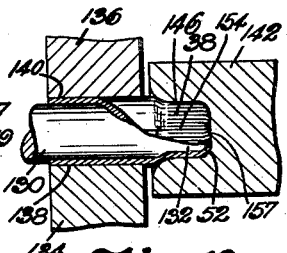

Referring more particularly to Figs. 14 to 18, inclusive, the tube 48 is next placed on an arbor 130 such that the notched tube end 50 is in alignment with a reduced arbor portion 132. Suitable clamps 134 and 136 may be reciprocated so that their semi-cylindrical surfaces 138 and 140, respectively, may bear against the periphery of the tube 48 and clamp the same to the arbor 130. A contracting tool 142 is reciprocable coaxially of the arbor 130 and is provided with a recess 144 having a cylindrical wall 146 that is slightly tapered along its axis. Near the front face 148 of the tool the tapered portion 146 is flared or rounded as at 152, so as to deflect the adjacent tube end 50 into engagement with the reduced arbor portion 132 upon movement of tool 142 from the position shown in Fig. 14 progressively to those shown in Figs. 16, 17 and 18. During movement of tool 142 from the position shown in Fig. 16 to that shown in Fig. 17, the tapered or rounded wall portion 152 progressively contracts the adjacent tube end 50 into engagement with the reduced arbor portion 132, whereby the substantially parallel sidewalls 154 of the semi-notches 34a are forced into engagement with each other. In Fig. 17, a notch portion 156 is yet to be contracted upon further movement of tool 142 into the position shown in Fig. 18. The wall 146 merges into the bottom 157 of the annular recess 144 at a radius which is utilized to crimp the end of the contracted tube portion 38 into the annular flange 52 in the manner shown in Figs. 17 and 18. In connection herewith, it is to be noted that the original notch in the strip and the combined notch in the tube are of the same shape, having two substantially parallel walls merging into oppositely flaring walls 158 near the open end of the notch. These flaring notch walls 158 combine to form a wedge-shaped notch 159 (see Fig. 17) during the contraction of the notched tube end 50 and prior to the flanging of the contracted tube end 38 as at 52. It can thus be understood that the notches 34 are so preformed as to permit of contraction of the notched tube end 50 and of flanging the contracted tube end 38 in such manner that the notch walls engage each other at 160 after such contraction and flanging, thus avoiding any overlap of material or gap in the reduced and flanged tube end.

To avoid removal of a tube 48 from the floating arbor 100 and deposition on the stationary arbor 130, the floating arbor 100 may be elongated to the right as viewed in Fig. 11 and reduced in diameter in the same manner as at 132 in Fig. 14. In that case, the clamps 134, 136 are properly coordinated with the elongated floating arbor 100 in the fashion shown in Fig. 14, it being then imperative that the surface 138 of the lower clamp 134 is flush with the surface 116 of the lower forming member 114 and that said lower clamp 134 is stationary and the other clamp 136 reciprocable, as can be readily understood. It is then also imperative that the contracting tool 142 is not in coaxial alignment with the floating arbor in its uppermost position, but in its lowermost position as can be readily understood. By thus utilizing the floating arbor for the contraction and flanging of the notched tube end 50, the tube is transferred from the tube forming station to the tube contracting and flanging station by mere advancement of the tube on the floating arbor.

*Formation of bead in tube wall*

Referring more particularly to Figs. 19 to 21, inclusive, the contracted and flanged tube is finally placed on an arbor 170 which may be stationary. Cooperating with this arbor are two reciprocable clamps 172 and 174 which force the tube against the arbor in the manner shown in Figs. 19 and 20. Arbor 170 is centrally recessed at 176 and receives a movable plunger 178 which has a frustro-conical surface 180, adapted to cooperate with the head 182 of a punch 184, slidable in a radial opening 186 of the arbor. Plunger 178 is normally urged to the right as viewed in Fig. 19 by a compression spring 188, while motion of said plunger in that direction is restricted by a pin 190 which is secured to the arbor and extends through an oblong slot 192 of the plunger. Cooperating with the punch 186 is a bead cavity 194, provided by one of the clamps 172, 174. While the clamps 172, 174 hold a tube clamped to the arbor 170 and thus brace the tube wall externally and internally against lateral deformation except a segmental portion intermediate end portions of the tube, plunger 178 is moved from the position shown in Fig. 19 to that shown in Fig. 21 by means of a reciprocable ram 196, whereby the frustro-conical surface 180 forces punch 184 outwardly into the position shown in Fig. 21. During such movement of the punch 184, the bead forming end 198 thereof forces the adjacent tube wall portion into surface engagement with the bead cavity 194, thus forming a raised bead 54 in the tube wall. Upon retraction of ram 196 into the position in Fig. 19, the plunger 178 is also retracted under the compression of spring 188, thus permitting punch 184 to withdraw from the raised bead, either by gravity or under the inducement of some mechanical or pneumatic provision (not shown).

For the sake of simplicity of construction and operation, the contracted and flanged tube may be beaded while remaining at the same place on the elongated floating arbor 100 where the contracting and flanging operation takes place. In that case one of the clamps 134, 136 may be provided with the bead cavity 194, the elongated floating arbor 100 may carry the plunger 178 and the punch 184, and the ram 196 may be independently reciprocable through the contracting tool 142.

While the embodiment of the present invention as herein disclosed, constitutes a preferred form, it is to be understood that other forms might be adopted, all coming within the scope of the claims which follow.

What is claimed is as follows:

1. A method for making from a strip of sheet material tubular members having a reduced end portion terminating in an annular inward flange, comprising the steps of notching one side of the strip at equal distances, each notch having substantially parallel wall portions terminating in outwardly flaring wall portions near the open end of the notch, severing the strip through consecutive notches to obtain blanks, each having a notch portion in the severed edges of the blank, forming a blank into tubular shape such that the notch portions combine to form a complete notch in an end portion of the tubular member, radially contracting the notched end portion of the tubular member until the parallel walls of the notch substantially engage each other to form a tubular portion of a reduced dimension, said flaring notch-wall-portions combining to form a wedge-shaped notch in an end portion of the contracted tube portion, and bending said end portion of said contracted tube portion inwardly toward the axis of the tubular member to such extent that the edges of said wedge-shaped notch are forced into substantial engagement with each other.

2. A method for making from a strip of sheet material tubular members having a reduced end portion, comprising the steps of notching one side of the strip at equal distances, severing the strip through consecutive notches to obtain blanks, each having a notch portion in the severed edges of the blank, bending two opposite end portions of a blank including the severed edges so that said end portions form certain angles with the remainder of the blank, preforming a blank portion intermediate the bent end portions over an arbor into a part of the desired cross-sectional shape of the tubular member, forming all blank portions other than said preformed portion about the arbor into the other part of the desired cross-sectional shape of the tubular member whereby the notch portions combine to form a complete notch in an end portion of the tubular member, and radially contracting the notched end portion of the tubular member around a reduced portion of the arbor having a diameter such that the radial contraction of said notched end portion causes the edges of the notch to be forced into substantial engagement with each other.

3. A method for making from a strip of sheet material tubular members having a reduced end portion terminating in an annular inward flange, comprising the steps of notching one side of the strip at equal distances, each notch having substantially parallel wall portions terminating in outwardly flaring wall portions near the open end of the notch, severing the strip through consecutive notches to obtain blanks, each having a notch portion in the severed edges of the blank, bending two opposite end portions of a blank including the severed edges so that said end portions form certain angles with the remainder of the blank, preforming a blank portion intermediate the bent end portions over an arbor into a part of the desired cross-sectional shape of the tubular member, forming all blank portions other than said preformed portion around the arbor into the other part of the desired cross-sectional shape of the tubular member whereby the notch portions combine to form a complete notch in an end portion of the tubular member, radially contracting the notched end portion of the tubular member until the parallel walls of the notch substantially engage each other, said flaring notch-wall-portions combining to form a wedge-shaped notch in an end portion of the contracted tube portion, and bending said end portion of said contracted tube portion inwardly toward the axis of the tubular member to such extent that the edges of said wedge-shaped notch are forced into substantial engagement with each other.

4. A method for making from a strip of sheet material tubular members having a knurled portion and a reduced end portion, comprising the steps of notching one side of the strip at equal distances, knurling portions of the strip between consecutive notches, severing the strip through consecutive notches to obtain blanks, each having a knurled portion and a notch portion in the severed edges of the blank, bending two opposite end portions of a blank including the severed edges so that said end portions form certain angles with the remainder of the blank, preforming a blank portion intermediate the bent end portions into a part of the desired cross-sectional shape of the tubular member, forming all blank portions other than said preformed portion into the other part of the desired cross-sectional shape of the tubular member whereby the notch portions combine to form a complete notch in an end portion of the tubular member, and radially contracting the notched end portion of the tubular member around an arbor having a diameter such that the radial contraction of said notched end portion causes the edges of the notch to be forced into substantial engagement with each other.

5. A method for making from a strip of sheet material tubular members, each having a bead and a reduced end portion terminating in an annular inward flange, comprising the steps of notching one side of the strip at equal distances, each notch having substantially parallel wall portions terminating in outwardly flaring wall portions near the open end of the notch, severing the strip through consecutive notches to obtain blanks, each having a notch portion in the severed edges of the blank, bending two opposite end portions of a blank including the severed edges so that said end portions form certain angles with the remainder of the blank, preforming a blank portion intermediate the bent end portions around an arbor into a part of the desired cross-sectional shape of the tubular member, forming all blank portions other than said preformed portion around the arbor into the other part of the desired cross-sectional shape of the tubular member whereby the notch portions combine to form a complete notch in an end portion of the tubular member, radially contracting the notched end portion of the tubular member around a reduced portion of the arbor having a diameter such that the radial contraction of said notched end portion causes the edges of the notch to be forced into substantial engagement with each other and forming said end portion of said contracted tube portion inwardly and against the end of the reduced portion of the arbor in order to cause the edges of said wedge-shaped notch to be located in substantial engagement with each other.

6. A method for making from a strip of sheet material tubular members, each having a bead, a knurled portion, and a reduced end portion terminating in an annular inward flange, comprising the steps of notching one side of the strip at equal distances, each notch having substantially parallel wall portions terminating in outwardly flaring wall portions near the open end of the notch, knurling portions of the strip between consecutive notches, severing the strip through consecutive notches to obtain blanks, each having a knurled portion and a notch portion in the severed edges of the blank, bending two opposite end portions of a blank including the severed edges so that said end portions form certain angles with the remainder of the blank, preforming a blank portion intermediate the bent end portions into a part of the desired cross-sectional shape of the tubular member, forming all blank portions other than said preformed portion into the other part of the desired cross-sectional shape of the tubular member whereby the notch portions combine to form a complete notch in an end portion of the tubular member, radially contracting the notched end portion of the tubular member until the parallel walls of the notch substantially engage each other, said flaring notch-wall-portions combining to form a wedge-shaped notch in an end portion of the contracted tube portion, bending said end portion of said contracted tube portion inwardly toward the axis of the tubular member to such extent that the edges of said wedge-shaped notch are forced into substantial engagement with each other, confining the wall of the tubular member against lateral deformation except a segmental portion intermediate end portions of the tubular member, and forcing said segmental wall portion outwardly into bead shape.

7. The method of making a tubular member having a reduced end portion terminating in an internal annular flange comprising the formation of a blank having parallel side edges spaced apart a distance substantially equal to the largest circumference of the completely formed tubular member, and having parallel end edges spaced apart a distance substantially equal to the length of the tubular member before the internal annular flange is formed, said side edges each being joined with the same end edge by a notch having an edge set in from said side edge of the blank and parallel thereto, said set-in edge of each notch being joined with the end edge of the blank by an oblique or flared edge portion, forming said blank into tubular shape such that the notch portions combine to form a complete notch in an end portion of the tubular member, radially contracting the notched end portion of the tubular member until the parallel walls of the notch substantially engage with each other to form a tubular portion of reduced diameter, said flaring or oblique notch-edge-portions combining to form a wedge-shaped notch in an end portion of the contracted tube portion, and bending said end portion of said contracted tube portion inwardly toward the axis of the tubular member to such extent that the edges of said wedge-shaped notch are forced into substantial engagement with each other.

8. The method of making a tubular member having a reduced end portion terminating in an internal annular flange comprising the formation of a blank having parallel side edges spaced apart a distance substantially equal to the largest circumference of the completely formed tubular member, and having parallel end edges spaced apart a distance substantially equal to the length of the tubular member before the internal annular flange is formed, said side edges each being joined with the same end edge by a notch having an edge set in from said side edge of the blank and parallel thereto, said set-in edge of each notch being joined with the end edge of the blank by an oblique or flared edge portion, forming said blank about a cylindrical arbor into tubular shape with the side edges of the blank abutting, the two notched portions of the blank combining to form a complete notch in an end portion of the tubular member, radially contracting the notched portion of the tubular member about a reduced portion of said arbor having a diameter such that the radial contraction of said notched end portion causes the edges of the notch to be forced into substantial engagement with each other, the oblique or flaring notch-edge-portions combining to form a wedge-shaped notch in the end portion of the contracted tube portion, and forming said end portion of said contracted tube portion inwardly and against the end of the reduced portion of the arbor in order to cause the edges of said wedge-shaped notch to be located in substantial engagement with each other.

CLARENCE J. KELLER.